United States Patent [19] [11] Patent Number: 4,897,882
Pickering [45] Date of Patent: Jan. 30, 1990

[54] MOTOR CONTROL APPARATUS AND METHOD
[75] Inventor: William Pickering, University Heights, Ohio
[73] Assignee: Caterpillar Industrial Inc., Mentor, Ohio
[21] Appl. No.: 321,694
[22] Filed: Mar. 10, 1989
[51] Int. Cl.[4] .............................................. H02P 5/16
[52] U.S. Cl. ..................................... 388/801; 318/139; 318/294; 318/284
[58] Field of Search ............... 388/802, 810, 801, 815; 318/280, 139, 282, 283, 284, 286, 287, 288, 289, 291, 292, 293, 275, 257, 430, 431, 294

[56] References Cited
U.S. PATENT DOCUMENTS

| | | | |
|---|---|---|---|
| 3,332,507 | 7/1967 | Bush | 318/284 |
| 3,980,934 | 9/1976 | Wright | 318/284 X |
| 4,365,189 | 12/1982 | Hawkins | 318/284 |
| 4,367,435 | 1/1983 | Bailey et al. | 318/257 |
| 4,378,855 | 4/1983 | Haub et al. | 318/284 X |
| 4,496,888 | 1/1985 | Campbell | 318/294 |
| 4,562,387 | 12/1985 | Lehnhoff | 318/294 X |
| 4,628,232 | 12/1986 | Saganovsky | 318/284 |
| 4,658,192 | 4/1987 | Casteel et al. | 318/257 |
| 4,680,513 | 7/1987 | Kennedy | 318/285 |
| 4,691,149 | 9/1987 | Baumgartner et al. | 318/331 |
| 4,706,005 | 11/1987 | Iwako | 318/430 X |
| 4,749,924 | 6/1988 | Watanabe et al. | 318/286 X |

FOREIGN PATENT DOCUMENTS
2118381 12/1985 United Kingdom .

Primary Examiner—William M. Shoop, Jr.
Assistant Examiner—Paul Ip
Attorney, Agent, or Firm—Stephen L. Noe

[57] ABSTRACT

Motor control systems are commonly associated with motors found on electric industrial vehicles, such as lift trucks. Advantageously, the control of such motors should be optimized such that current is timely supplied to the motors in conjunction with selection of the appropriate motor direction. The instant apparatus 10 includes a logic device 24 for receiving speed and direction demand signals from respective speed and direction selection devices 20,22. The logic device 24 responsively produces respective motor speed and direction command signals. A motor control device 26 receives the command signals and directs the electrical current from a power source 18 through the motor 12. A transducer device 38 senses the actual direction of electrical current flow through the motor 12 and produces responsive feedback signals. The logic device 24 produces at least one motor direction interrogation pulse in response to receiving the speed and direction demand signals and prior to delivering the motor command signals. The interrogation pulse directs a small amount of electrical current from the power source 18 through the motor 12, insufficient to actually cause rotation of the motor 12. The logic device 24 then compares the direction demand signals and the direction feedback signals and determines if and when command signals can properly be delivered to the motor control device 26.

10 Claims, 2 Drawing Sheets

MOTOR CONTROL APPARATUS AND METHOD

DESCRIPTION

1. Technical Field

This invention relates generally to an apparatus and method for controlling an electric motor associated with a vehicle and, more particularly, to an apparatus and method for controllably determining the status of the direction contactors associated with an electric motor and optimally operating the motor only when the contactors are in the proper logical state.

2. Background Art

Bidirectional electric motors are associated with various industrial equipment in common use today. For example, industrial work vehicles, such as lift trucks, commonly have several associated electric motors. In particular, electric lift trucks include traction or drive motors having bidirectional capability. The direction of operation of a drive motor is commonly controlled by the orientation of switching contacts surrounding either the armature or field of the motor. In order to control motor rotation direction, one or the other set of contacts is closed while a related set is opened, causing electrical current to flow in a particular direction through the motor winding.

Such systems suffer from various problems and limitations. One particular problem is the time required for the direction contactor to change contact states. Since the contactor is magnetically actuated by electrical current flowing through an associated coil, a finite period of time is required for the contacts to switch from one state to another. In order to allow for unavoidable variations in switching time from one contactor to another, time delays are commonly designed into the control circuitry to deal with the worst case expected switching time. If the time delay is too short, arcing will occur between the contact tips, greatly reducing contactor life. On the other hand, if the delay period is too long, the system becomes less responsive than is optimum. This is especially critical in cases where plugging or electrical breaking is desired. In these situations, it is important that switching times be minimized in order to best utilize the advantages offered by electrical breaking. However, in prior systems the delays can never be less than the anticipated worst case contactor switching time associated with particular contactors in the system.

In addition to the problems associated with providing for switching delays, it is common in high current applications for contact tips to inadvertently become stuck or welded together. In such cases, when a signal is sent to the contactor coil requiring a change in contact status, switching does not occur because of the welded contacts. This is a particular problem when the contactor is designed to change direction of a traction motor on a work vehicle. For example, if the contactor associated with the work vehicle is positioned to drive the vehicle forward, and reverse direction is desired, selection of reverse direction followed by application of current to the motor windings could result in the vehicle moving in the wrong direction in the event of welded contacts. Some mechanism is desirable for dealing with this situation.

One example of an apparatus designed to deal with welding of contact tips is found in the United Kingdom Pat. No. GB 2 118 381 B published on Dec. 4, 1985, and issued to Wolfgang Schuckert. This patent teaches use of complex logic circuitry for sensing the direction of motor rotation following application of current to the motor, and for determining if the sensed direction is appropriate in view of the signals supplied to the system indicating the desired direction. However, while this system will detect the presence of a welded contact, it is only effective after actual motor current is applied to the system. Therefore, the vehicle will begin to move in the contactor-selected direction, regardless of the validity of the contactor status. In other words, the failed contactor will only be sensed after the vehicle is energized for actual operation. No optimization of contactor utilization can occur, because any delays required for engaging the contactors are still required by the disclosed system. In fact, the description is only that of a failed contactor sensor, and does not solve the other problems described above.

The present invention is directed to overcoming one or more of the problems as set forth above.

DISCLOSURE OF THE INVENTION

In one aspect of the present invention a motor control apparatus for controlling a motor associated with a vehicle is provided. The vehicle includes an electric motor, an electric power source, a speed selection element for controllably producing motor speed demand signals, and a direction selection element for controllably producing motor direction demand signals. A logic device receives the speed and direction demand signals and responsively produces respective motor speed command and motor direction command signals. A motor control device receives the speed and direction command signals and responsively directs electrical current from the power source through the motor. A transducer senses the actual direction of electrical current flowing through the motor and produces responsive motor direction feedback signals. The logic device produces at least one motor direction interrogation pulse in response to receiving the speed and direction demand signals. The motor control device receives the direction interrogation pulse and responsively directs a predetermined amount of current from the power source through the motor. The predetermined amount of current is insufficient to cause the motor to rotate. The logic device compares the direction demand signals and the direction feedback signals and produces the speed command signals only in response to the comparison results indicating that the actual motor direction corresponds to the desired motor direction.

In a second aspect of the present invention, a method for controlling a motor associated with a vehicle is provided. The vehicle includes an electric motor, an electric power source, a speed selection device for controllably producing motor speed demand signals, and a direction selection device for controllably producing motor direction demand signals. The method includes the steps of controllably directing a predetermined amount of electrical current from the power source through the motor. The predetermined amount of current is insufficient to cause the motor to rotate. The actual direction of electrical current flowing through the motor is then sensed and respective motor direction feedback signals are produced in response to the sensed direction. Speed and direction demand signals and the direction feedback signals are received, and the direction demand signals and direction feedback signals are compared with one another. Electrical current responsive to the speed demand signals is directed from the power source through the motor only in response to the comparison of signals indicating that the actual motor direction corresponds to the desired motor direction.

The instant invention provides a motor control system which advantageously responds directly to the actual status of the direction contactor associated with an electric motor. Timing of the application of current to the electric motor is precisely controlled in response to the direction contactor achieving the desired status. Failure of the contacts to achieve the desired status prohibits electrical current from being delivered to the motor and, in a preferred embodiment, causes an error signal to be generated.

BRIEF DESCRIPTION OF THE DRAWINGS

For a better understanding of the present invention, reference may be made to the accompanying drawings, in which.

BEST MODE FOR CARRYING OUT THE INVENTION

Figure 1:
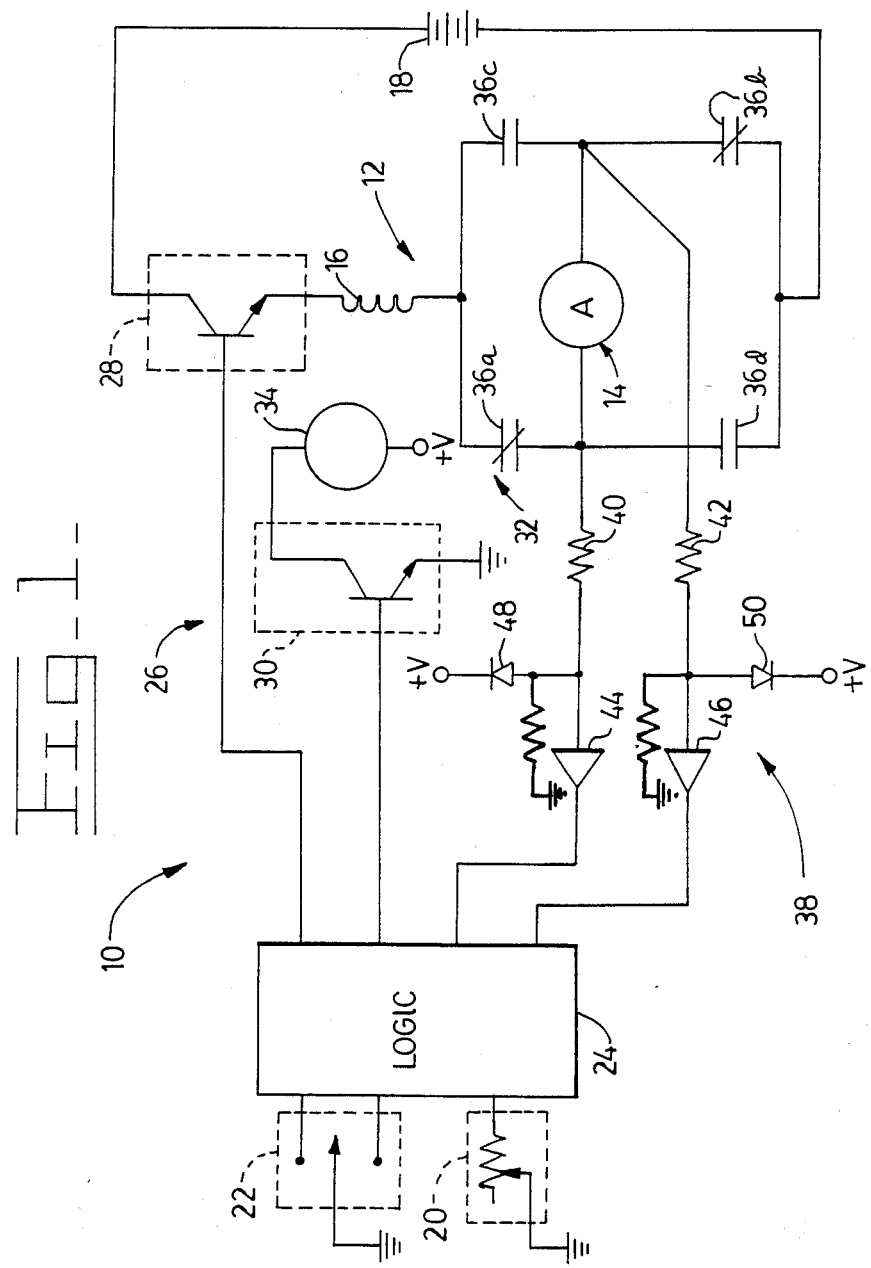
FIG. 1 is a schematic representation of a circuit associated with one embodiment of the present invention; and, FIG. 2 is a flowchart of software associated with the embodiment of FIG. 1.

Referring first to FIG. 1, an apparatus embodying certain of the principles of the present invention is generally indicated by the reference numeral 10. It should be understood that the following detailed description relates to the best presently known embodiment of the apparatus 10. However, the apparatus 10 can assume numerous other embodiments, as will become apparent to those skilled in the art, without departing from the appended claims.

The apparatus 10 is associated with a vehicle, for example, an industrial work vehicle such as a lift truck. The particular vehicle associated with the apparatus 10 forms no part of the instant invention and is not shown in the drawings. The apparatus 10 includes an electric motor 12 having armature and field windings 14,16, an electric power source 18, a speed selection device 20, and a direction selection device 22. In the preferred embodiment, the electric power source 18 is a storage battery of the type generally associated with electric traction vehicles.

The speed selection device 20 is adapted to controllably produce motor speed demand signals, and can be, for example, a potentiometer type analog device or a digital encoder. In any event, output signals delivered from the speed selection device 20 are suitable for electronic processing and for controlling the actual motor speed of the electric motor 12. The direction selection device 22 controllably produces motor direction demand signals. In the typical embodiment, the direction selection device 22 is a simple spring biased, center "off" switch capable of selecting either forward or reverse motor direction. Operating in conjunction with one another, the direction selection device 22 and the speed selection device 20 are the operator control elements utilized to operate the motor 12 at the desired speed and in the desired direction.

A logic device 24 is adapted to receive the speed and direction demand signals from the speed selection device 20 and direction selection device 22. Responsively, the logic device 24 produces respective motor speed command and motor direction command signals. In a preferred embodiment, the logic device 24 is a properly programmed microprocessor.

A motor control device 26 is adapted to receive the speed and direction command signals and responsively controllably direct electrical current from the power source 18 to at least one of the motor armature and field windings 14,16. In a typical embodiment, the motor control device 26 includes a solid state chopper circuit 28. In response to receiving the speed command signals, the chopper circuit 28 delivers predetermined current pulses from the power source 18 to the motor 12.

The motor control device 26 also includes a direction control circuit 30 which receives the direction command signals and responsively supplies electrical current from the power source 18 to a direction contactor 32. The direction contactor 32 includes a coil 34 which magnetically operates associated contacts 36a-d. A transducer device 38 is adapted to sense the actual direction of electrical current flowing through the motor 12, and to produce respective motor direction feedback signals in response to the sensed current direction.

The transducer device 38 includes first and second resistors 40,42 connected to respective ends of the one of the motor armature and field windings. In the embodiment shown in FIG. 1, the first and second resistors 40,42 are connected to respective ends of the armature 14 intermediate the respective pairs of direction contacts 36a-d. The opposite ends of the resistors 40,42 are connected to respective buffers 44,46. Each of the input terminals to the buffers 44,46 is also connected to the positive logic supply voltage through a respective diode 48,50. Output signals from each of the buffers 44,46 are delivered to the logic device 24.

Industrial Applicability

Operation of the apparatus 10 is best described in relation to its use on a vehicle, for example, an industrial vehicle such as an electric lift truck. Assume first that the vehicle is stationary and that power has not been applied to either the direction contactor 32 or to the motor 12. In the embodiment shown in FIG. 1, one set of direction contacts 36a,b are normally closed and the other set of direction contacts 36c,d are normally open. Consequently, a current path is established from the power source 18 through the chopper 28, the field 16, the direction contact 36a, the armature 14, and the direction contact 36b, back to the power source 18. However, because the chopper 28 is turned "off", no current flows at this time.

Assuming now that the vehicle is to be operated, the logic device 24 first produces at least one motor direction interrogation pulse in response to receiving speed and direction demand signals from the speed selection device 20 and the direction selection device 22. The motor control device 26 receives the direction interrogation pulse and responsively controllably directs a predetermined amount of electrical current from the power source 18 through the motor 12. In other words, the chopper 28 is turned "on" very briefly by the logic device 24 and allows a small amount of current to flow through the motor 12. The predetermined amount of current is insufficient to overcome the inertia of the motor 12 and associated work vehicle elements. Therefore, the motor 12 does not rotate. The transducer device 38 senses the actual direction of current flow through the motor 12 and responsively provides motor direction feedback signals to the logic device 24. The logic device 24 then compares the direction demand signals and the direction feedback signals and produces the speed command signals only in response to the comparison of signals indicating that the actual motor direction corresponds to the desired motor direction.

Once the logic device 24 senses that the direction contactor 32 has attained the demanded control status, vehicle control progresses in accordance with commonly known methods of such control. However, the logic device 24 continues to repeatedly compare the produced direction demand signals with the actual direction feedback signals. The motor speed command signals continue to be produced only in response to each comparison of the demand and feedback signals indicating that the actual motor direction continues to correspond to the desired motor direction established by the direction demand signals. Therefore, even during ongoing operation of the motor 12, failure of the direction contactor will immediately cause the motor speed command signals to stop being produced.

The speed command signals are initially produced by the logic device 24 only after correspondence between the direction demand signals and the direction feedback signals occurs. This eliminates any effect from contact bounce, which is known to cause contact arcing and pitting.

At any time during vehicle operation, in response to the signals delivered to the logic device 24 indicating a lack of correspondence between the direction demand signals and the actual motor direction feedback signals, an error signal is produced by the logic device 24. However, this error signal is produced only after a predetermined time following production of the direction interrogation pulse. Therefore, a failed contactor 32 will cause the error signal to be produced. The error signal can be utilized by the vehicle control logics to disable the vehicle, to sound an alarm, or to take other appropriate vehicle action.

Figure 2:
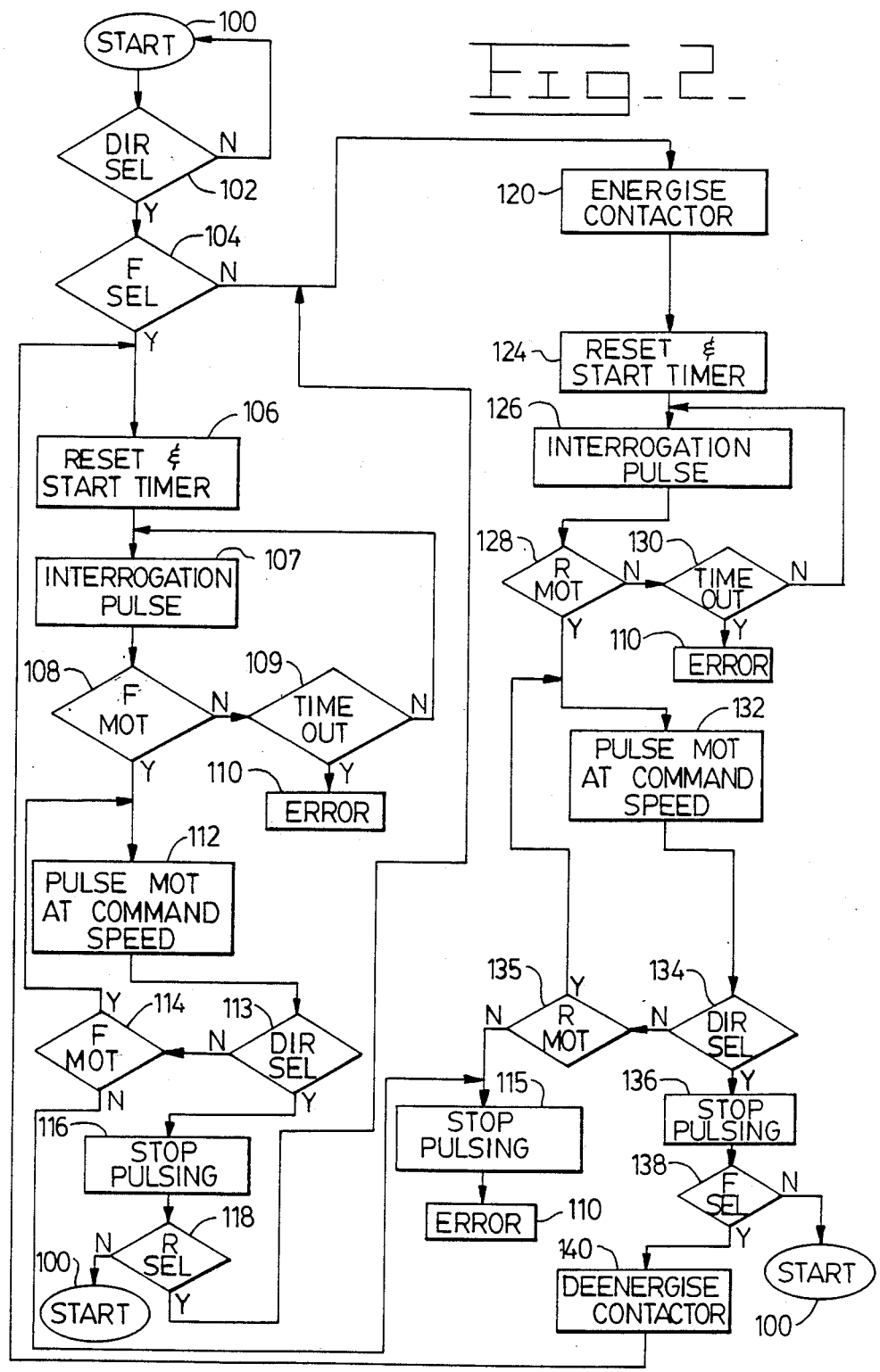

As noted above, in the preferred embodiment of the instant invention the logic device 24 is a properly programmed microprocessor. In FIG. 2, a functional flowchart defining the internal programming for such a microprocessor is demonstrated. From this flowchart, a programmer of ordinary skill can develop a specific set of program instructions that performs the steps necessary to implement the instant invention. A description of the flowchart follows:

Assume first that no motor direction has been selected and the vehicle is stationary, and that the normal or deenergized status of the direction contacts 36a–d is such that a forward motor direction is the default orientation. Therefore, the direction selection device 22 has not been operated, and the contacts 36a–d of the contactor 32 are in their normal, de-energized positions. Beginning at the block 100 labeled START, the status of the direction selection device 22 is continuously monitored at the block 102. Assuming that the direction selection device 22 has not changed states, the program continuously loops back to the block 100. Once a desired change in direction is detected at the block 102, the actual direction selected is determined at the block 104. Assuming that the forward direction has been selected, control passes to the block 106.

At the block 106 a timer register of the logic device 24 is reset and begins counting. Once the timer has begun counting, an interrogation pulse is delivered at the block 107. The transducer device 38 is then monitored at the block 108 to determine whether forward status of the contactor 32 (corresponding to forward motor rotation) has been attained. If not, the timer is examined at the block 109 to determine whether it has timed out. If time remains, control loops back to the block 107 where another interrogation pulse is delivered, and the cycle repeats.

The duration of the timer interval determines when the system will indicate that a failure of the contactor 32 has occurred. The timer is, therefore, established at some duration longer than the maximum switching time that the contactor 32 should ever require. If this maximum time is exceeded, it can be assumed with a fair degree of certainty that the contact tips have failed or that something in the switching circuitry for the contactor 32 is defective. In any case, it is undesirable to energize the motor 12 in this situation because the actual motor direction may be the opposite of that desired. Therefore, an error signal is generated at the block 110. However, in the normal course, the contactor 32 will switch in far less than the maximum timer duration, and efficiency is optimized. This is in opposition to conventional contactor control design in which a predetermined delay must be established at the maximum or worst switching time anticipated from the contactor 32. Therefore, the instant system response is optimized in accordance with actual system dynamics.

Assuming that forward direction is successfully detected by the transducer device 38, the program then progresses to the block 112 in which the motor 12 is pulsed at the speed commanded in response to the speed demand device 20. The direction selection is continuously monitored at the block 113 for any change and the actual direction of motor rotation is continuously monitored at the block 114. Assuming that the direction selection device 22 and the contactor orientation has not been modified, control loops back to the block 112 where motor command pulses are repetitively produced at the required rate.

In response to detecting an unexpected change in the orientation of the direction contacts at the block 114, motor pulsing is stopped at the block 115 and an error signal is generated at the block 110. In response to detecting a change in the direction selection device 22 at the block 113, motor pulsing is stopped at the block 116 and the direction of the direction selection device 22 is then determined at the block 118. If the direction selection device 22 has not been switched to the reverse mode, control passes back to the start block 100. This will be the case in the event that the direction selection device 22 is moved to the neutral position and no further motor pulsing is required at that time.

In the event that the reverse direction has been selected at the block 118, control then passes to the right side of the flowchart of FIG. 2, where the coil 34 of the contactor 32 is energized at the block 120. As described previously with respect to the left side of the flowchart of FIG. 2, a timer register of the logic device 24 is reset at the block 124 and begins counting. The interrogation pulse is delivered at the block 126, and the transducer device 38 is monitored at the block 128 to determine if the reverse status of the contactor 32 has been attained. If not, the timer is examined at the block 130 to determine whether it has timed out. If it has not done so, control loops back to the block 126 where another interrogation pulse is delivered and the cycle repeats. If the timer has timed out at the block 130, the error signal is generated at the block 110.

Assuming that the contactor 32 attains the reverse status prior to timeout of the timer register, control passes to the block 132 in which the motor 12 is pulsed at the commanded speed. This is exactly the same as the motor pulsing found on the left side of the flowchart. Again, at the blocks 134 and 135 the direction selection device 22 and the contactor 32 orientation are continuously monitored for a change, and if no change is sensed the program loops to produce the desired motor speed command pulses.

A change in the orientation of the direction contacts detected at the block 135 results in control passing to the block 115 where motor pulsing is stopped, followed by generation of the error signal at the block 110. Once a change in the status of the direction selection device 22 is detected at the block 134, program control passes to the block 136 where motor pulsing is stopped, and then to the block 138 where the direction selection device 22 is inspected to determine whether the forward direction has been selected. If not, it is assumed that the direction selection device 22 has been placed in the neutral position, and the program returns to the start block 100. Assuming that the forward direction has again been selected, the coil 34 of the contactor 32 is de-energized at the block 140, and control then passes to the block 105, where the process of determining whether the contacts have switched back to the normally de-energized position begins.

It will be appreciated by those skilled in the art that it is not essential to incorporate all of the steps represented in the flowchart of FIG. 2 in a given system, nor is it necessary to implement the steps of FIG. 2 in a microprocessor as described. However, such implementation is deemed to be the best mode of practicing the invention owing to the broad and widespread availability of suitable microprocessor circuits, the widespread use of such circuits in industrial vehicle logic controls, the cost reduction normally obtained by utilizing microprocessors, and the flexibility afforded by such programmed devices.

The described embodiment of the present invention advantageously optimizes the application of drive current pulses to the traction motor 12 of an industrial vehicle, while avoiding premature application of current to the motor 12. In addition, the instant invention is capable of detecting failure of the contactor 32 or welding of the contact tips 36a–d. The apparatus 10 is capable of determining operability of the direction control system prior to application of drive current to the motor 12, and continues to monitor the direction selection contactor 32 status throughout the operation of the motor 12.

Other aspects, objects, advantages and uses of this invention can be discerned from a study of the drawings, the disclosure and the appended claims.

I claim:

1. Apparatus for controlling a motor associated with a vehicle, said vehicle including an electric motor having armature and field windings, an electric power source, speed selection means for controllably producing motor speed demand signals, and direction selection means for controllably producing motor direction demand signals, comprising:

logic means for receiving said speed and direction demand signals and responsively producing respective motor speed command and motor direction command signals;

motor control means for receiving said speed and direction command signals and responsively controllably directing electrical current from said power source through at least one of said motor armature and field windings;

transducer means for sensing the actual direction of electrical current flow through said motor and producing respective motor direction feedback signals in response to said sensed direction of current flow; and wherein said logic means produces at least one motor direction interrogation pulse in response to receiving said speed and direction demand signals, said motor control means receives said direction interrogation pulse and responsively controllably directs a predetermined amount of electrical current from said power source through said motor, said predetermined amount of current being insufficient to cause said motor to rotate, and wherein said logic means compares said direction demand signals and said direction feedback signals and produces said speed command signals only in response to said comparison of signals indicating that the actual motor direction corresponds to the desired motor direction established by said direction demand signals.

2. Apparatus, as set forth in claim 1, wherein said logic means repeatedly compares said produced direction demand signals and said direction feedback signals, and continues to produce said motor speed command signals only in response to each comparison of signals indicating that the actual motor direction continues to correspond to the desired motor direction established by said direction demand signals.

3. Apparatus, as set forth in claim 1, wherein said speed command signals are produced by said logic means after a predetermined optimal time delay following correspondence between said direction demand signals and said direction feedback signals.

4. Apparatus, as set forth in claim 3, wherein said logic means produces an error signal in response to failure of said direction feedback signals to correspond with said direction demand signals within a predetermined time following production of said direction interrogation pulse.

5. Apparatus, as set forth in claim 1, wherein said motor control means includes at least one direction contactor having a coil responsively connected to said logic means and adapted to receive said direction command signals and having contacts arranged about said one of said motor armature and field windings in a manner sufficient to controllably direct current from said electric power source through said one winding in a direction corresponding to said direction command signals.

6. Apparatus, as set forth in claim 5, wherein said transducer means includes first and second buffers connected between the logic device and respective first and second ends of the armature winding.

7. A method for controlling a motor associated with a vehicle, said vehicle including an electric motor having armature and field windings, an electric power source, speed selection means for controllably producing motor speed demand signals, and direction selection means for controllably producing motor direction demand signals, comprising the steps of:

controllably directing a predetermined amount of electrical current from said power source through one of said motor armature and field windings, said predetermined amount of current being insufficient to cause said motor to rotate;

sensing the actual direction of electrical current flow through said motor and producing respective motor direction feedback signals in response to said sensed direction of current flow; and receiving said speed and direction demand signals and said direction feedback signals, comparing said direction demand signals and said direction feedback signals, and directing electrical current responsive to said speed demand signals from said power source through said one of said motor armature and field windings only in response to said comparison of signals indicating that the actual motor direction corresponds to the desired motor direction established by said direction demand signals.

8. A method, as set forth in claim 7, including the steps of repeatedly comparing said produced direction demand signals and said direction feedback signals, and continuing to direct said electrical current responsive to said speed demand signals from said power source through said one of said motor armature and field windings only in response to each comparison of signals indicating that the actual motor direction continues to correspond to the desired motor direction established by said direction demand signals.

9. A method, as set forth in claim 7, including the step of directing electrical current responsive to said speed demand signals from said power source through said one of said motor armature and field windings only after a predetermined optimal time delay following correspondence between said direction demand signals and said direction feedback signals.

10. A method, as set forth in claim 7, including the step of producing an error signal in response to failure of said direction feedback signals to correspond with said direction demand signals within a predetermined time following delivery of said predetermined amount of electrical current from said power source through said one of said motor armature and field windings.

* * * * *